United States Patent [19]

Souchik, Jr.

[11] Patent Number: 4,616,973

[45] Date of Patent: Oct. 14, 1986

[54] WIND DRIVEN TURBINE

[76] Inventor: Nicholas Souchik, Jr., Little Gloucester Rd., Apt. S 37, Blackwood, N.J. 08012

[21] Appl. No.: 687,778

[22] Filed: Dec. 31, 1984

[51] Int. Cl.$^4$ ................................................ F03D 3/04
[52] U.S. Cl. ............................ 415/2 R; 415/DIG. 1; 415/4
[58] Field of Search ............ 415/DIG. 1 A, 2 R–4 R; 416/197 A

[56] References Cited

U.S. PATENT DOCUMENTS

| 1,578,923 | 3/1926 | Schlotter | 415/2 A X |
|---|---|---|---|
| 1,790,175 | 1/1931 | Spencer | 415/2 R X |
| 3,883,750 | 5/1975 | Uzzell | 290/55 |
| 4,012,163 | 3/1977 | Baumgartner | 415/2 |
| 4,045,144 | 8/1977 | Loth | 415/DIG. 1 A X |
| 4,047,832 | 9/1977 | Sforza | 415/DIG. 1 A X |
| 4,088,419 | 5/1978 | Hope | 415/2 |
| 4,105,362 | 8/1978 | Sforza | 415/DIG. 1 A X |
| 4,116,581 | 9/1978 | Bolie | 415/2 |
| 4,127,356 | 11/1978 | Murphy | 415/2 |
| 4,140,433 | 2/1979 | Eckel | 415/2 |
| 4,182,594 | 1/1980 | Harper et al. | 415/2 A |
| 4,204,126 | 5/1980 | Diggs | 290/55 |
| 4,213,734 | 7/1980 | Lagg | 415/2 A X |
| 4,254,843 | 3/1981 | Han | 180/165 |
| 4,258,271 | 3/1981 | Chappell | 290/54 |
| 4,278,896 | 7/1981 | McFarland | 290/55 |
| 4,302,684 | 11/1981 | Gogins | 290/55 |
| 4,428,711 | 1/1984 | Archer | 415/2 A |
| 4,449,887 | 5/1984 | Mundhenke | 416/132 B X |
| 4,516,907 | 5/1985 | Edwards | 415/3 A X |
| 4,530,638 | 7/1985 | Andruszkiw et al. | 415/4 |

FOREIGN PATENT DOCUMENTS

| 595497 | 4/1934 | Fed. Rep. of Germany | 416/9 |
|---|---|---|---|
| 3122663 | 3/1982 | Fed. Rep. of Germany | 415/DIG. 1 A |
| 973968 | 2/1951 | France | 415/DIG. 1 A |

Primary Examiner—Everette A. Powell, Jr.

[57] ABSTRACT

A device and method of extracting energy from a moving stream such as an ocean current and the wind using a new and different augmenter system. Light weight augmenters are provided that circulate and focus portions of the moving stream to improve performance of a horizontal axis turbine system. Both turbine and augmenter systems are elevated above ground drag effects by a support structure. Means are provided to orient the device with changing stream direction and vary the augmenter system with changing stream velocity. Means are provided for conversion of the energy extracted from the moving stream to useful electrical or mechanical energy. Means are provided to protect the device and minimize maintenance.

8 Claims, 5 Drawing Figures

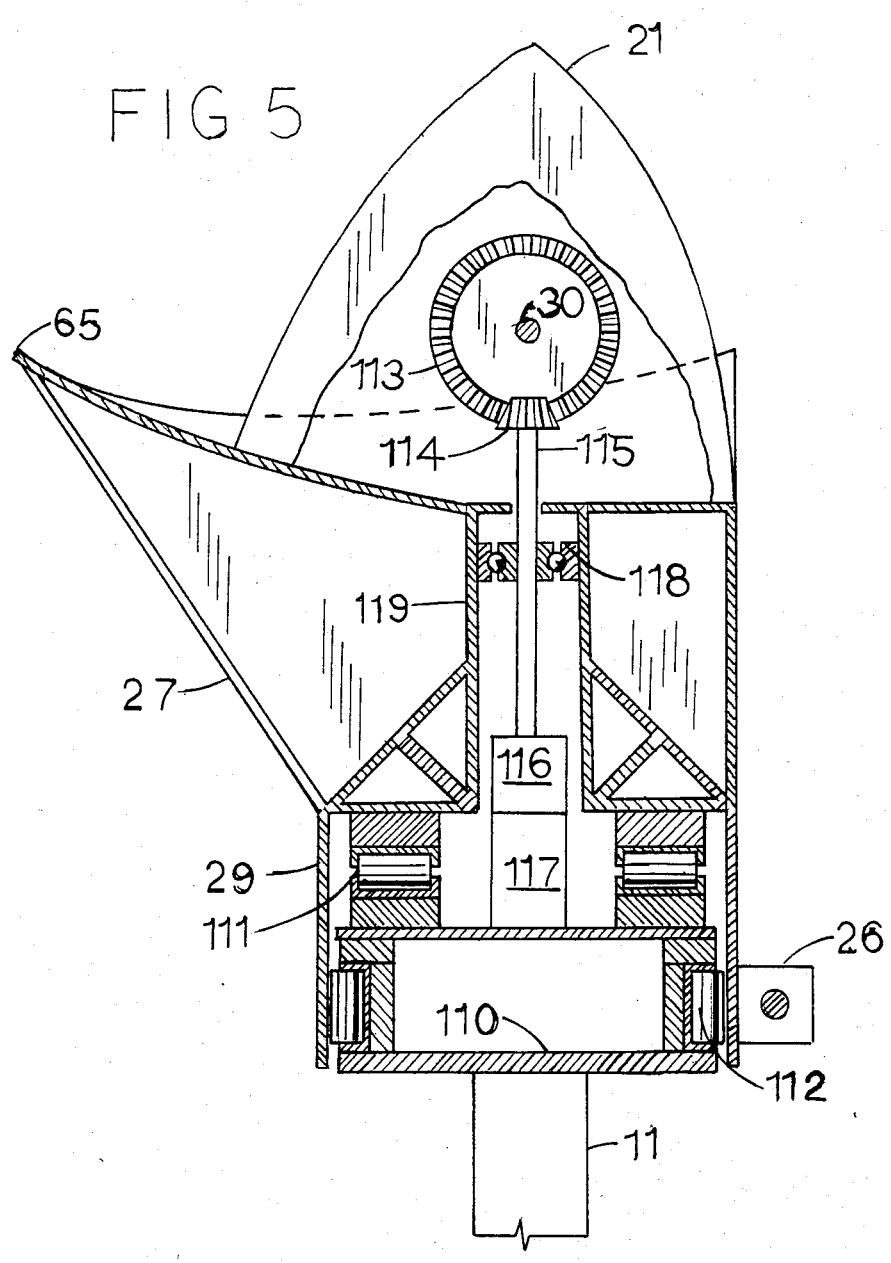

WIND DRIVEN TURBINE

REFERENCES CITED

U.S. patent Document Nos. 3,883,750, 5/1975—Uzzell, 4,012,163, 3/1977—Baumgartner, 4,088,419, 5/1978—Hope, 4,116,581, 9/1978—Bolie, 4,127,356, 11/1978—Murphy, 4,140,433, 2/1979—Eckel, 4,204,126, 5/1980—Diggs, 4,254,843, 3/1981—Han 4,278,896, 7/1981—McFarland, 4,302,684, 11/1981—Gogins.

BACKGROUND OF THE INVENTION

1. Field of the Invention

This device relates to an augmented turbine power plant that extracts energy from a moving stream such as a river, an ocean current, and the wind.

2. Description of Prior Art

Wind, ocean currents, and rivers have long been recognized as sources of alternate energy. Two groups of devices lead the state of the art for converting moving stream energy to useful electrical or mechanical energy.

The more recent and current leader in the state of the art in wind energy conversion is the twin blade device. It consists of specifically shaped propellar blades pivoted at the top of a support structure. The shape of the blades cause a circulation in the air stream around the blades which produces rotation. However these blades work efficiently at only high tip speeds. These devices are impractical for underwater use and sites with lower average wind velocities.

The larger the blades become, the lower the rotations per minute and requires less efficient high gearing ratios to a generator.

The augmentation of a sawmill waterwheel by constructing a dam across a stream is the oldest representative of the second group of devices. The modern versions are hydroelectric dams. However dams are impractical in wind and ocean currents. Dams require massive investment, are only feasible at a few sites, and cause considerable damage to the environment. Several recent attempts have been made to augment a turbine to eliminate the inadequacies of the current leaders in the state of the art. Murphy's "Wind Motor Machine" demonstrates many of the problems with augmenting a turbine in a free stream. A converging tube augmenter focuses more of the wind than would effect the turbine without the tube. However the tube requires considerable structural support to obtain large volumes of wind and must be rolled around tracks at ground level. This places the mouth of the tube in the slowest velocity stream present at a site due to ground drag effects. Uzzell's "Method and Apparatus for Generating Power From Wind Currents" elevates a Venturi tube type augmenter above ground drag effects, however the support structure required to elevate the augmenter makes it uneconomical for large volumes of wind required in a slow moving stream. McFarland's "Wind Power Generator" uses a shield to improve efficiency of a verticle axis turbine. However the structural requirements of the shield and turbines and the ground drag effects on the turbine results in similar shortcomings as Murphy's device. Hope's "Wind Operated Power Plant" uses an airplane wing type augmenter and a vertical construction efficiency. However the turbines interfere with the circulation required by the wing augmenters to perform their function. Other patents referenced are less promising than those devices discused above.

SUMMARY OF THE INVENTION

New and Different Function

I have invented a device with a new and different augmenter system. The augmenter circulates and focuses portions of the moving stream which produces the same conditions as tube type augmenters but with far lower structural requirements. The turbine does not interfere with the circulating function of the augmenter and the augmenter does not require high tip speed and is efficient at all wind or water speeds. This makes the device feasible at low wind velocity sites and underwater. An elevated horizontal axis turbine and augmenter system placed out of the effects of ground drag make more energy available to the device.

OBJECTS OF THE INVENTION

An object of the invention is to extract usable energy from moving streams such as wind, rivers, and ocean currents. Further objects are to achieve the above with a device that is durable yet economical to build and maintaine.

The specific nature of the invention, as well as other objects, uses, and advantages therof, will clearly appear from the following description and from accompanying drawings, the different views of which are not scale drawings.

BRIEF DESCRIPTION OF THE DRAWINGS

FIG. 5 is a sectional view taken from FIG. 4.

DESCRIPTION OF THE PREFERRED EMBODIMENT

Figure 1:
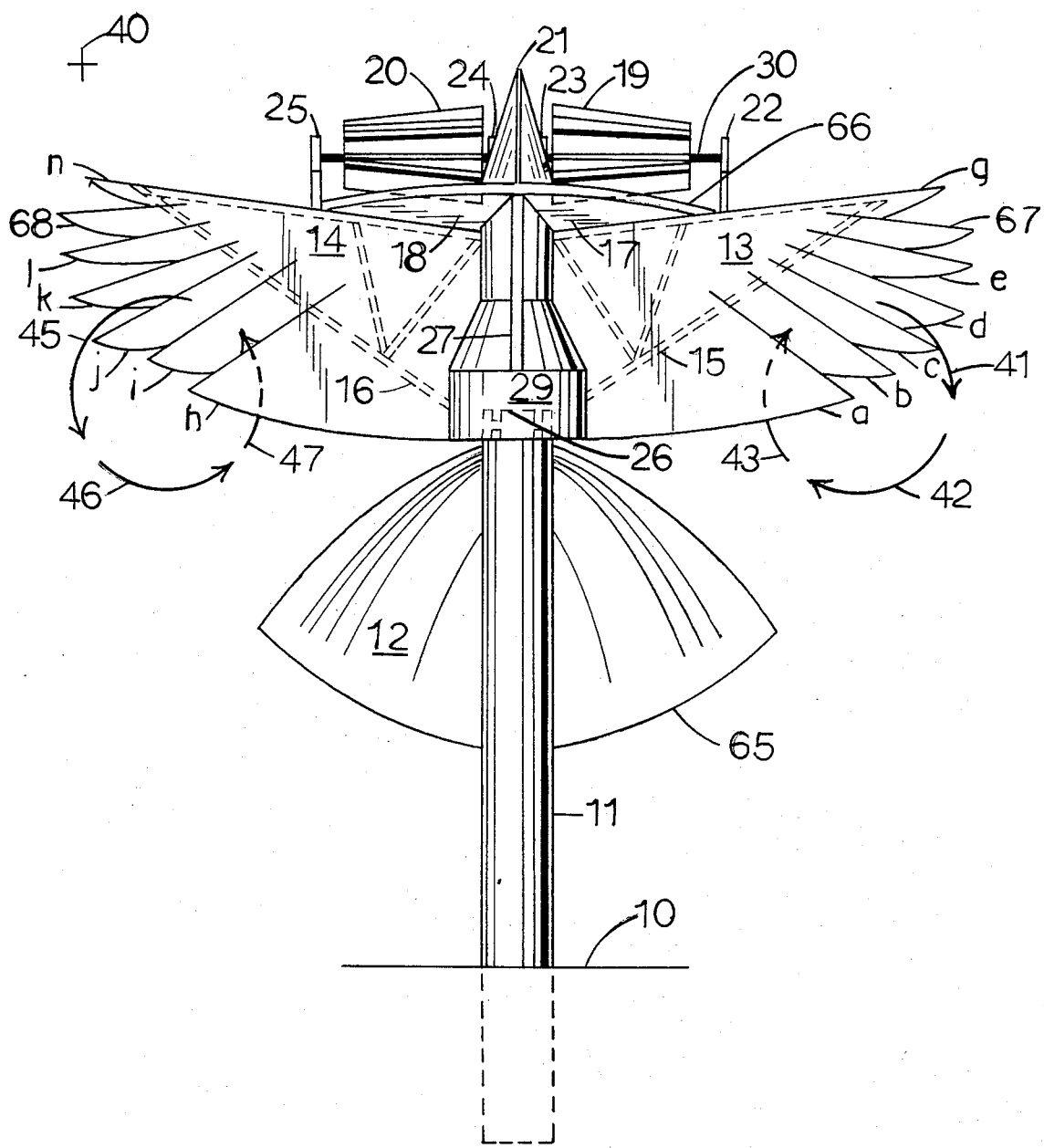
FIG. 1 is a front view of the device in a moving stream
Figure 2:
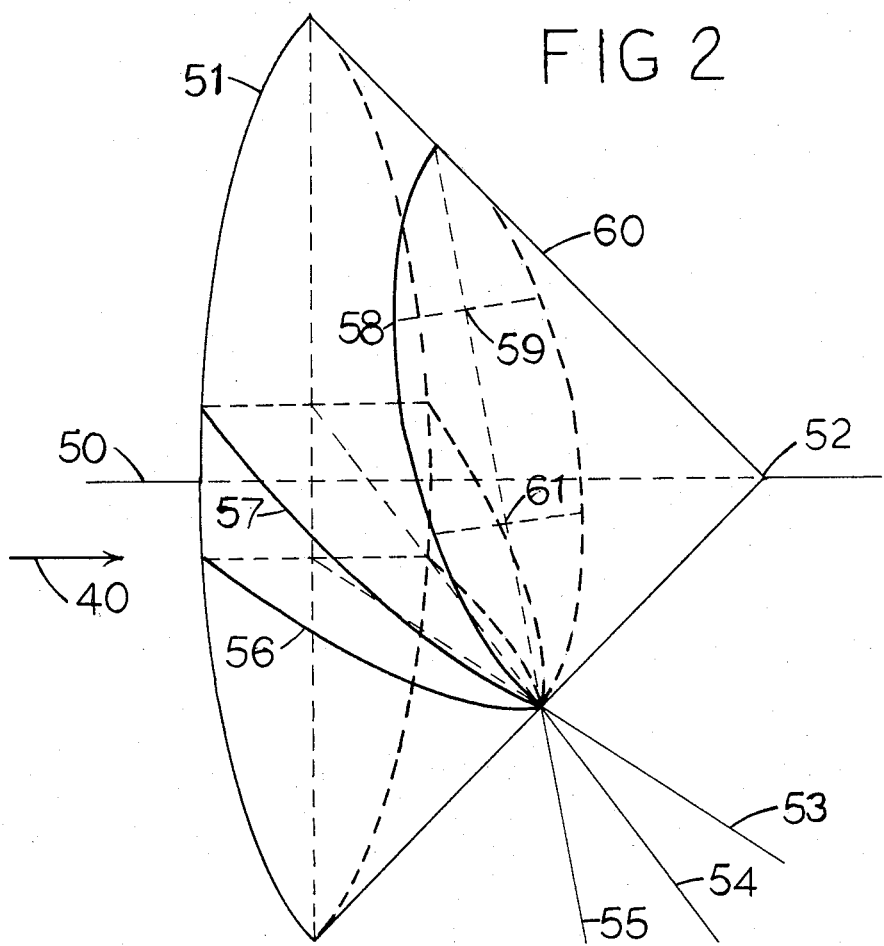
FIG. 2 is a schematic of augmenter system geometry

FIG. 1 refers to the front view of the device claimed when viewed by an observer located upstream of the device. Ground 10 can be the grade level at a wind energy site or ocean floor. A single pylon support structure 11 is provided and buried as required as required by structural requirements. The invention is not limited to this particular design of support structure. On top of support structure 11, rotational platform 29 has support truss 15 and support truss 16 mounted on 29 to hold right base augmenter 13 and left base augmenter 14 in an outstreached position. The governor augmenter 12 is attached to platform 29 by a hinge connection 26 hidden from this view behind 29. Right throat augmenter 17 and left throat augmenter 18 are held in position by similar frame structure as 15 and 16 and held at one attack angle by stream splitter support 27. In combination 15, 17 and 27 form a triangular truss with a high strength to weight ratio. Similarly on the left side 16, 18, and 27 form another high strength truss. Rotating platform 29 is covered by nacelle 21 which has journal bearings 23 and 24 mounted on 21. Journal bearings 22 and 25 are supported on top of truss 15 and 16 respectively. Rotating shaft 30 turns inside journals 22,23 24, and 25. Turbine 19 and turbine 20 are mounted on shaft 30. Although American savonus type turbines are shown, this does not limit the invention to this one turbine design. Right base augmenter 13 in combination with governor augmenter 12 are positioned in the moving stream to create overpressure in front of the augmenters and underpressures downstream of each augmenter such that angular momentum is added to produce clockwise circulating stream 41,42,43. Left base augmenter 14, and governor augmenter 12 produce counter clockwise circulation 45,46,47. In higher viscosity moving streams smaller sub-augmenters a,b,c,d,e,67,g,h,i,j,k,l,68, and n are provided to add drag produced circulation to enhance base and governor circulation producing function. The relative position between the turbine system and augmenter system is not limited to this one embodiment for the invention. In highly predictable ocean currents turbines and augmenter may be mounted on seperate support structures. FIG. 2 provides a geometric description of the augmenter system prefered embodiment to achieve the other primary function of the augmenters, focusing the circulating streams downstream of the device. With 40 indicating a moving stream direction and axis 50 represents the axis of a right circular cone 60 is oriented parallel to stream direction 40 with cone focus 52 downstream of cone base 51. Planes 53,54, and 55 cut through the cone at different angles forming hyperbolic surface 56, parabolic surface 57, and elliptical surface 58 respectively. In the prefered embodiment, the augmenter system is shaped and held in position in the moving stream by the support structure to form elliptical surface 58, with governor 12 having a focus at 61, throat augmenters in combination having focus 59, and in combination base, throat and governor augmenters have a common focus 52. The circulating streams produced by the base and governor augmenters come under the cone shaped underpressure zone behind the augmenter system and are focused toward the cone axis 50 and cone focus 52.

Figure 3:
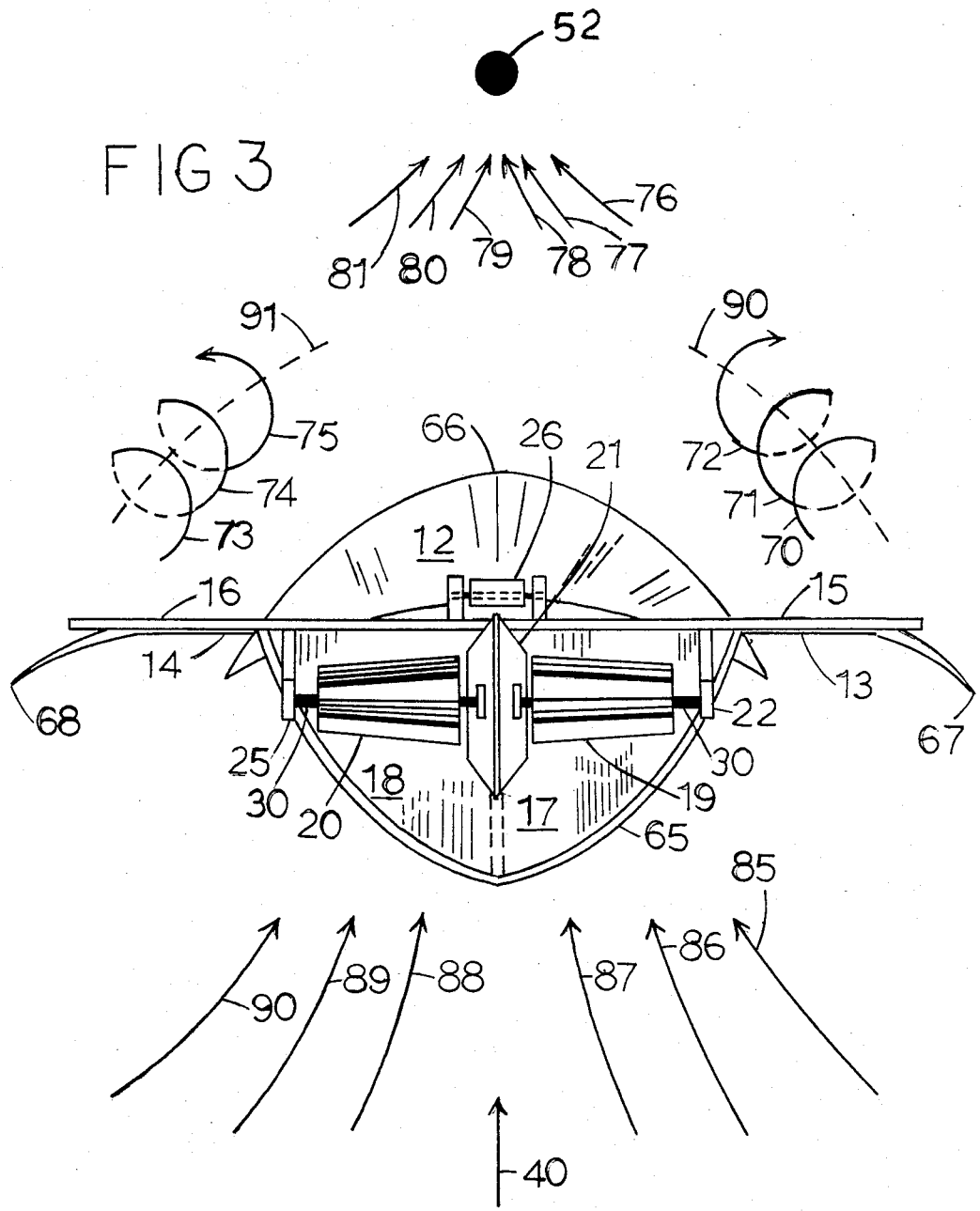
FIG. 3 is a top view of the device in a moving stream

FIG. 3 represents a top view of the device in moving stream 40 directed from bottom to top. Right throat augmenter 17 and left throat augmenter 18 having leading edge 65 shaped similar to the leading edge of the elliptical surface shown in FIG. 2. Governor augmentor 12 has trailing edge 66 similar to the elliptical surface trailing edge shown in FIG. 2. The edges of the base augmenters also are extended to points 67 and 68 such that all portions of moving stream 40 going around and behind the augmenter system converge toward common focus 52. Clockwise circulating stream 41,42,43, with its axis of rotation previously paralled to moving stream direction 40 is turned by the focusing effect of the augmenter system at position indicated by circulating stream 70.71,72 with axis of rotation 90 becoming nearly perpendicular to stream direction 40. Further downstream this circulating stream converges toward common focus 52 at locations 76,77,78. In a similar manner counterclockwise stream 45,46,47, axis of rotation is turned to 73,74,75, with axis 91 and later downstream toward common focus 52 at 79,80,81. Right throat augmenter 17 in combination with left throat augmenter 18 focus streams 85,86,87,88,90 into turbines 19 and 20. Nacelle 21 has streamline shape to improve stream flow through the turbine system.

Figure 4:
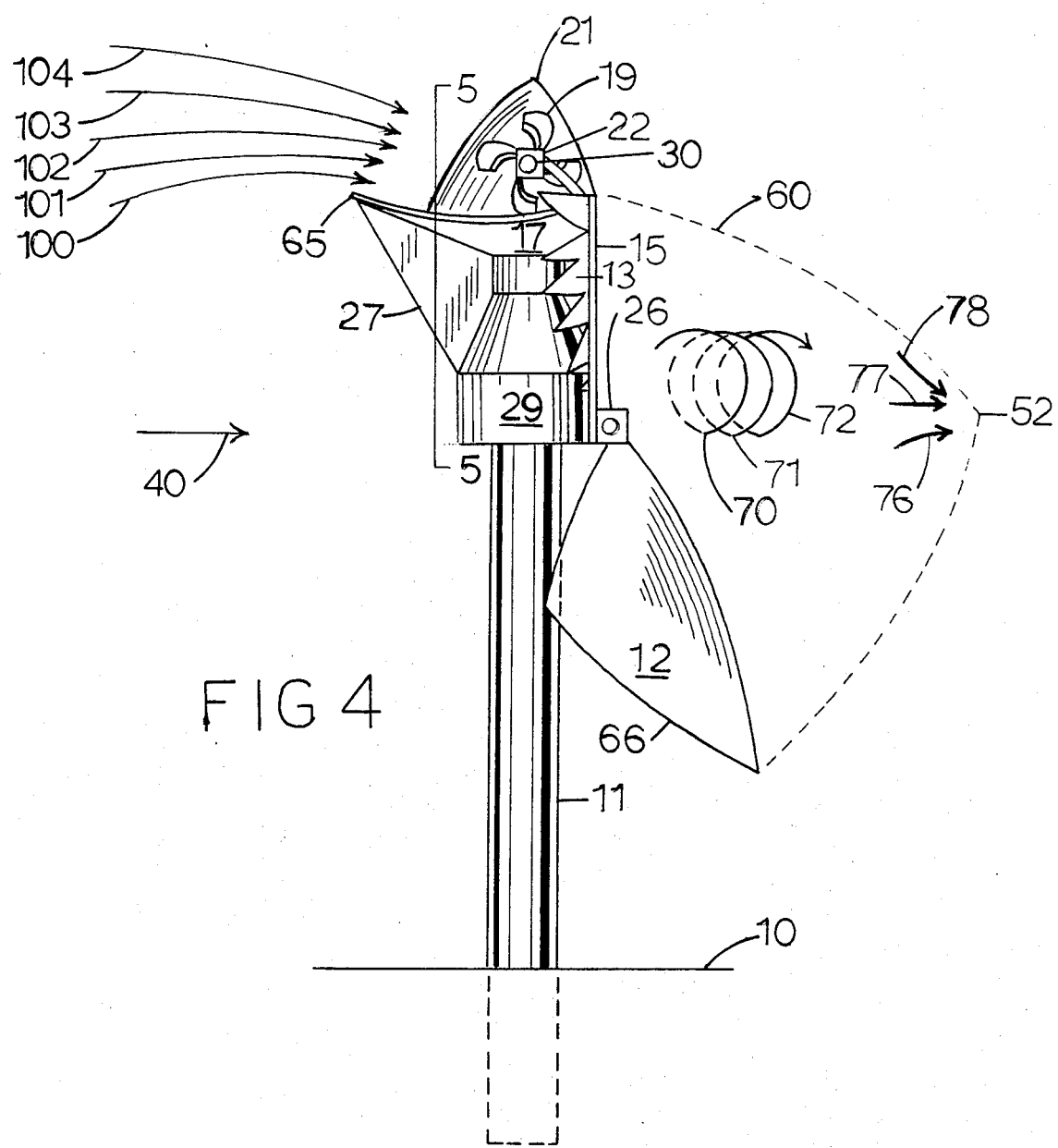
FIG. 4 is a side view of the device in a moving stream

FIG. 4 shows a side view of the device with moving stream 40 direction left to right. Support structure 11 is indicated in ground 10 to support the augmenter and turbine system and resist the overturning moment caused by moving stream forces on the augmenter system, turbine system, and support structure. Governor augmenter 12 is attached to rotational platform 29 by hinge 26 at the furthest point downstream on 29. The drag force on 12 maintains the downstream position of it automatically during a change in stream direction. This also helps keep the turbine system axis perpendicular to moving stream direction 40. The nacelle 21 and interior of platform 29 are sectioned at 5 and provided in FIG. 5. Moving stream direction 40 which can be a representation of wind or ocean current observes physical laws similar to a slow moving incompressible fluid. The focused circulation 70,71,72 rotates with an axis almost perpendicular to moving stream 40. A higher mass flow rate is produced in the area above 70,71,72 which decreases the backpressure below and downstream of turbine 19 resulting in improved performance. The reduced pressure behind the turbine system allows the portion of the stream influencing the turbine system 100,101,102,103, and 104 to have a higher volumetric flow rate to increase power to the turbine than would be available without the augmenters.

The same conditions are created on the other side of the device hidden from this view to drive turbine 20. The circulating stream 70,71,72 converge at location 76,77,78 toward focus 52 and further reduce the backpressure downstream of the augmenter system for improved device performance. As moving stream 40 varies in velocity, governor augmentor 12 is able to swing on its hinge 26 since the drag force is proportional to stream velocity. During dangerous stream velocities governor augmenter 12 will swing up to a minimum attack angle and greatly reduce the overturning moment on the support structure as a means of protection. At sites where stream velocity is unsteady the varying attack angle of the governor augmenter 12 maintains a constant backpressure for improved turbine performance. The vertical orientation of the base and governor augmenters require no support for snow loading and reduce requirements of the support structure. The higher flow rate into the turbine system allows a higher revolutions per minute for the turbine and more efficient gearing to the turbine.

FIG. 5 shows a cut away view of nacelle 21 and rotational platform 29. On top of support structure 11 rotational platform 29 is able to rotate by means of a set of roller bearings 111 mounted on base plate 110. At least two others are provided to allow 29 to turn in any stream direction. Roller bearings 112 are also provided to resist overturning of nacelle 21. Flywheel 113 is mounted on turbine shaft 30 and protected inside the nacelle 21. Flywheel 113 has its circumference provided with bevel gear 113. Bevel gear 114 and generator shaft 115 transfer power from the turbine system to the transmission 116 and generator 117. The shaft 115 is held in position in raceway 119 by ball bearing 118 inside a journal. Nacelle 21 reduces maintenance on gears and generator. The device claimed is not limited by this one method of transferring power from turbine system to generator or pump shaft. The method indicated allows the turbine system to turn in any direction while the generator remains stationary. This eliminates a set of slip rings that would be required if the generator was also required to rotate.

What is claimed is:
1. In combination:
a pylon support structure provided with means to elevate to minimize ground drag effects in a moving stream, a platform mounted on said support structure provided with means to rotate in any moving stream direction, a frame mounted on said platform provided with means to extend horizon- tally to the ground from the vertical axis of said pylon support structure, a shaft elevated horizontal to the ground and perpendicular to the moving stream provided with means to rotate around said shaft axis, a multiple number of turbines rigidly mounted on said shaft provided with blades with means to transfer kinetic energy of a moving stream to rotational mechanical energy of said shaft, a rotational mechanical energy utilization device such as a generator provided with means to do useful work, a power transmission provided with means to transfer power from said shaft to said utilization device and means to change the rotational speed of said shaft to match the rotational speed of said utilization device, an augmenter rigidly mounted on said frame upstream of said turbines provided with a continuous surface to divert the moving stream and provided with a right circular cone conic section curved leading edge with said curved edge major axis bisects said continuous surface and is oriented perpendicular to the midpoint of said shaft with said leading edge upstream of said edge geometric focus with said focus elevated below said turbines and said major axis angle to the moving stream fixed, an augmenter rigidly mounted below and downstream of said turbines provided with a continuous surface to divert the moving stream provided with a right circular cone conic section curved trailing edge oriented with curved trailing edge bisecting said surface with a major axis oriented perpendicular to the midpoint of said shaft with said trailing edge geometric focus below said turbines and at a fixed angle to the moving stream, said augmenter trailing edge is provided with means to add angular momentum to the moving stream oriented with clockwise circulations produced in the portion of the stream passing over the right said trailing edge of said augmenter when viewed from an upstream position and counterclockwise circulations produced in the portion of the stream passing over the left said trailing edge of said augmenter when viewed from an upstream position, an augmenter mounted by hinge means to said rotational platform downstream of the midpoint of said shaft provided with a continuous surface and a right circular cone conic section curved trailing edge oriented with said curved trailing edge major axis bisecting said surface and oriented perpendicular to the midpoint of said shaft with said trailing edge downstream and below said platform.

2. The apparatus of claim 1 wherein said rigidly mounted right circular cone conic section trailing edged augmenter is provided with multiple sub-augmenters mounted on the right said trailing edge provided with the right half of continuous surfaces with right circular cone conic section curved trailing edges and multiple sub-augmenters mounted on the left said trailing edge provided with the left half of continuous surfaces with right circular cone conic section curved trailing edges each said sub-augmenter provided with orientation to add angular momentum to the portion of the moving stream passing over said trailing edges.

3. The apparatus of claim 1 wherein said augmenters in combination are oriented in the moving stream to provide a cone shaped low pressure zone downstream of said augmenters provided with means to focus the portion of the stream passing of said leading edge and said trailing edges.

4. The apparatus of claim 3 wherein said augmenter edges form an ellipse with said augmenter continuous surfaces concave into the stream.

5. The apparatus of claim 1 wherein for wind energy conversion said turbines are modified American Savonius type with blade diameter decreasing from the midpoint of said shaft to said shaft ends.

6. The apparatus of claim 1 wherein a Nacelle is provided to protect said powere transmission with an orientation over the midpoint of said shaft with means to split the stream in two equal portions and with means to provide streamline flow for minimum interference to the moving stream.

7. The apparatus of claim 1 wherein said augmenter with a leading edge is oriented to provide an accelerated moving stream into the power generating portion of said turbine blades.

8. The apparatus of claim 1 wherein said hinge connected augmenter is provided with means to vary said continuous surface attack angle with changes in stream velocity.

* * * * *